United States Patent [19]
Diederich et al.

[11] Patent Number: 6,017,486
[45] Date of Patent: Jan. 25, 2000

[54] COMPREHENSIVE FUME COLLECTION SYSTEM FOR PRODUCTION OF LEADED STEEL

[75] Inventors: David J. Diederich; John C. Paddock, both of Avon Lake; Ralph Dybiec, North Royalton; Donald E. Kocka, Broadview Heights; Thomas F. Bearding, North Ridgeville, all of Ohio

[73] Assignee: USS/Kobe Steel Company, Loraine, Ohio

[21] Appl. No.: 09/065,298

[22] Filed: Apr. 23, 1998

Related U.S. Application Data

[60] Provisional application No. 60/069,682, Dec. 12, 1997.

[51] Int. Cl.[7] .................................. C21B 7/00; C21B 7/22
[52] U.S. Cl. ........................... 266/142; 266/158; 266/159
[58] Field of Search ..................... 266/142, 143, 266/157, 158, 159

[56] References Cited

U.S. PATENT DOCUMENTS

| | | | |
|---|---|---|---|
| 429,337 | 6/1890 | Collin | 266/158 |
| 2,122,032 | 6/1938 | Goldberg et al. | 266/158 |
| 2,774,123 | 8/1956 | Reighart | 266/158 |
| 3,380,371 | 4/1968 | Scheel | 266/158 |
| 3,539,168 | 11/1970 | Pfeuffer | 266/159 |
| 3,604,697 | 9/1971 | Kawana | 266/159 |
| 3,648,996 | 3/1972 | Yonezawa et al. | 266/159 |
| 3,809,376 | 5/1974 | Plazier | 266/158 |
| 3,814,408 | 6/1974 | Cominotti | 266/275 |
| 4,031,819 | 6/1977 | Applewhite | 266/159 |
| 4,050,367 | 9/1977 | Eakes . | |
| 4,050,682 | 9/1977 | Baum . | |
| 4,081,269 | 3/1978 | Nomine et al. . | |
| 4,243,208 | 1/1981 | Laimer . | |
| 4,256,289 | 3/1981 | Neuner et al. . | |
| 4,270,738 | 6/1981 | Dangeleit et al. . | |
| 4,359,177 | 11/1982 | Noto La Diega . | |
| 4,379,548 | 4/1983 | Boshoven . | |
| 4,460,389 | 7/1984 | Baum et al. | 55/273 |
| 4,527,609 | 7/1985 | Nugent | 164/253 |
| 4,568,065 | 2/1986 | Talonen | 266/157 |
| 4,671,499 | 6/1987 | Ishiyama et al. | 266/275 |
| 4,724,895 | 2/1988 | Mulesa | 266/157 |
| 4,739,972 | 4/1988 | Podrini | 266/275 |
| 4,770,395 | 9/1988 | Vo Thanh et al. | 266/275 |
| 4,783,377 | 11/1988 | Kreth | 266/159 |
| 4,792,123 | 12/1988 | Moser et al. | 266/142 |
| 4,834,346 | 5/1989 | Heyer et al. | 266/143 |
| 4,836,510 | 6/1989 | Weber et al. | 266/142 |
| 5,645,121 | 7/1997 | Barnes | 164/475 |

*Primary Examiner*—Scott Kastler
*Attorney, Agent, or Firm*—Fay, Sharpe, Fagan, Minnich & McKee, LLP

[57] ABSTRACT

A comprehensive fume collection system, particularly adapted for the collection of lead-containing fumes or gases typically emitted during the manufacture of leaded steel, is disclosed. The preferred fume collection system comprises four sections, each serving a particular portion of the steelmaking process—(i) a casting floor fume collection system, (ii) a ladle slag dumping fume collection system, (iii) a tundish cooling fume collection system, and (iv) a torch cutting fume collection system.

19 Claims, 2 Drawing Sheets

COMPREHENSIVE FUME COLLECTION SYSTEM FOR PRODUCTION OF LEADED STEEL

CROSS-REFERENCE TO RELATED APPLICATIONS

The present application claims priority from U.S. Provisional Application Ser. No. 60/069,682, filed Dec. 12, 1997.

BACKGROUND OF THE INVENTION

1. Field of the Invention

The present invention relates to the collection of hazardous, or at least potentially hazardous, fumes emitted from a process for manufacturing leaded steel.

2. Description of the Related Art

It is well known that lead is toxic. In fact, lead poisoning is one of the oldest occupational diseases in the world. Once lead enters the body, it can cause anemia, damage the kidneys, interfere with the nervous system, cause memory loss, and cause reproductive disorders and birth defects.

The manufacture of leaded steel produces copious amounts of lead-containing fumes and dust. When lead, or an alloy mix containing lead, is heated to high temperatures, such as during melting and pouring operations, fuming occurs. The resulting fumes contain significant amounts of lead. Lead-containing dust is also produced at various process components during cooling, or cleaning, such as after the production of leaded steel. Lead-containing dust is also produced during cutting of leaded steel or other post forming operations.

Lead particles or dust are sufficiently small such that once airborne, they can remain airborne for extended periods of time. This significantly increases the risk of inhalation of lead into the body. Once lead-containing dust or fumes enter the lungs, about 50% of the lead is absorbed into the bloodstream. Lead may also enter the body by ingesting food or smoking cigarettes that have been handled by lead-contaminated hands. Although a smaller proportion of lead enters the bloodstream from ingestion, i.e. only about 10%, this is still a significant proportion.

In view of these significant concerns, prior artisans have devised various fume collecting systems for use in the production of leaded steel. In U.S. Pat. No. 4,524,819, Yoshimura, recognizing the dangers associated with the emission of lead-containing fumes, described a hood utilized between a tundish containing molten leaded steel and a mold. The hood is said to prevent toxic gases and fumes from diffusing and polluting the atmosphere. Although satisfactory, this approach provides fume collection at only one point of the manufacturing process.

In U.S. Pat. No. 4,527,609 to Nugent, a continuous casting plant is disclosed. Nugent described a three stage exhaust hood that collects emissions from a portion of the process, namely that downstream of a tundish, and in and around the mold and cooling or spray chamber. Again, although satisfactory, this approach ignores fumes and dust emitted from other portions of the process.

In yet another approach, Mulesa disclosed a technique and apparatus for collecting fumes during a leaded steel strand casting operation. In U.S. Pat. No. 4,724,895, Mulesa described an exhaust hood provided between a ladle and a tundish that serves to collect fumes from the tundish when in a noncasting position such as when cooling. Mulesa also described collecting fumes emitted during a torch cutting operation in which solidified steel strands are cut into pieces and sprayed with water. Mulesa further described collecting relatively hot and dry air at a location immediately upstream of the torch cutting station. The relatively hot dry air is mixed with the cooler wet gases collected from the torch cutting area to prevent condensation of the cooler gases prior to and during a filtering operation. Again, although representing an improvement over prior art approaches to fume collection, Mulesa's technique only collects hazardous fumes from a portion of the process.

Accordingly, there remains a need for an improved technique and apparatus for collecting hazardous, or at least potentially hazardous, fumes from a continuous casting operation, particularly a leaded steel manufacturing process. Specifically, in view of the increasing awareness of the health dangers associated with the inhalation and ingestion of lead, it would be desirable to provide a comprehensive fume collection system particularly adapted for the collection of lead-containing fumes or gases emitted during the manufacture of leaded steel.

Furthermore, the collection of airflows containing hazardous fumes also presents difficulties stemming from the relatively high temperatures of the airflows. Mulesa recognized this and attempted to mix relatively low temperature collected air with higher temperature airflows to avoid problems associated with such high temperature airflows. Although satisfactory, Mulesa's technique would not be practical for a comprehensive fume collection system due to the number of airflows and variance in properties and characteristics of each airflow. Accordingly, there is a need for a relatively simple and economical system and technique for protecting against excessively hot airflows that would be collected in a comprehensive fume collection system.

SUMMARY OF THE INVENTION

The present invention achieves the foregoing objectives and provides, in a first aspect, a fume collection system for a steelmaking process. The system comprises a ladle cover, a tundish cover, an enclosure adapted to receive a ladle and the cover during a slag dumping operation, and a filtering apparatus for removing particulate hazardous agents from the ladle, tundish, and the enclosure.

In another aspect, the present invention provides a fume collection system for a process for producing steel in which molten steel contained in a ladle is discharged into a tundish, and subsequently discharged from the tundish to other components in the process. The fume collection system comprises a ladle cover adapted to cover the ladle, the ladle cover having provisions for collecting fumes from around the outer periphery of the ladle and directing the fumes to a ladle port. The system also comprises a tundish cover that is adapted to cover the tundish, and includes provisions for collecting fumes from within and around the outer periphery of the tundish, and directing the fumes to a tundish cover port. The system further comprises a filtering device which is adapted to remove particulate hazardous agents, such as lead, from a moving airflow. The filtering device is in communication with the ladle cover and tundish cover, whereby upon operation of the filtering device, fumes and airflow from the ladle and tundish components are drawn into the filtering device. The fume collection system of the present invention further comprises an enclosure adapted to receive the ladle and ladle cover during a slag dumping operation. The enclosure preferably includes provisions for lifting the cover from the ladle, and a ladle tilting mechanism for tilting the ladle to a slag dumping position. The enclosure further includes air intakes and exhausts, and provisions for drawing relatively fresh air into the enclosure. The fume collection system further comprises another filtering device in communication with one or more exhaust ports of the enclosure. Upon operation of the second filtering device, fumes and airflow from the enclosure are drawn into the second filtering device.

In yet another aspect, the present invention provides a comprehensive fume collection system for a leaded steel manufacturing process. The process includes (i) a casting area in which molten leaded steel is discharged from a ladle into a tundish, and in which the molten leaded steel is subsequently discharged to form leaded steel strands, (ii) a slag dumping area in which slag is emptied from the ladle, (iii) a tundish cooling area in which the tundish is cooled, and (iv) a torch cutting area in which the leaded steel strands are severed. The fume collection system of the present invention comprises a ladle cover adapted to fit upon and generally cover the ladle, the ladle cover having provisions for collecting fumes from around the outer periphery of the ladle and directing the collected fumes to a collection port defined in the ladle cover. The fume collection system further comprises a tundish cover and hood assembly adapted to fit upon and generally cover the tundish, the tundish cover and hood assembly including provisions for collecting fumes from within and around the outer periphery of the tundish, and directing the collected fumes to at least one collection port defined in the tundish cover and hood assembly. The tundish preferably is movable between a casting area and a cooling area. The fume collection system further comprises a first filtering apparatus adapted to filter particles, such as lead from an airflow, and a first duct providing communication between the ladle cover, the tundish cover and hood assembly, and the first filtering apparatus. The fume collection system further comprises a dumping bay defining an interior region and having at least one intake, an exhaust, and provisions for drawing relatively fresh air into the interior region of the bay through at least one intake. The fume collection system further comprises a second filtering apparatus adapted to filter particles such as lead from an airflow, and a second duct providing communication between the exhaust of the dumping bay and the second filtering apparatus. The fume collection system further comprises a third filtering apparatus adapted to filter particles such as lead from an airflow, and a third duct providing communication between the tundish cover and hood assembly and the third filtering apparatus when the tundish and the cover and hood assembly are moved to the tundish cooling area. And, the fume collection system further comprises a torch cutting enclosure having an interior region and provisions for collecting air from the interior region and directing the collected air to an exhaust. A fourth filtering apparatus and duct are also provided to filter particles such as lead from the exhaust of the torch cutting enclosure.

DESCRIPTION OF THE PREFERRED EMBODIMENTS

Figure 1:
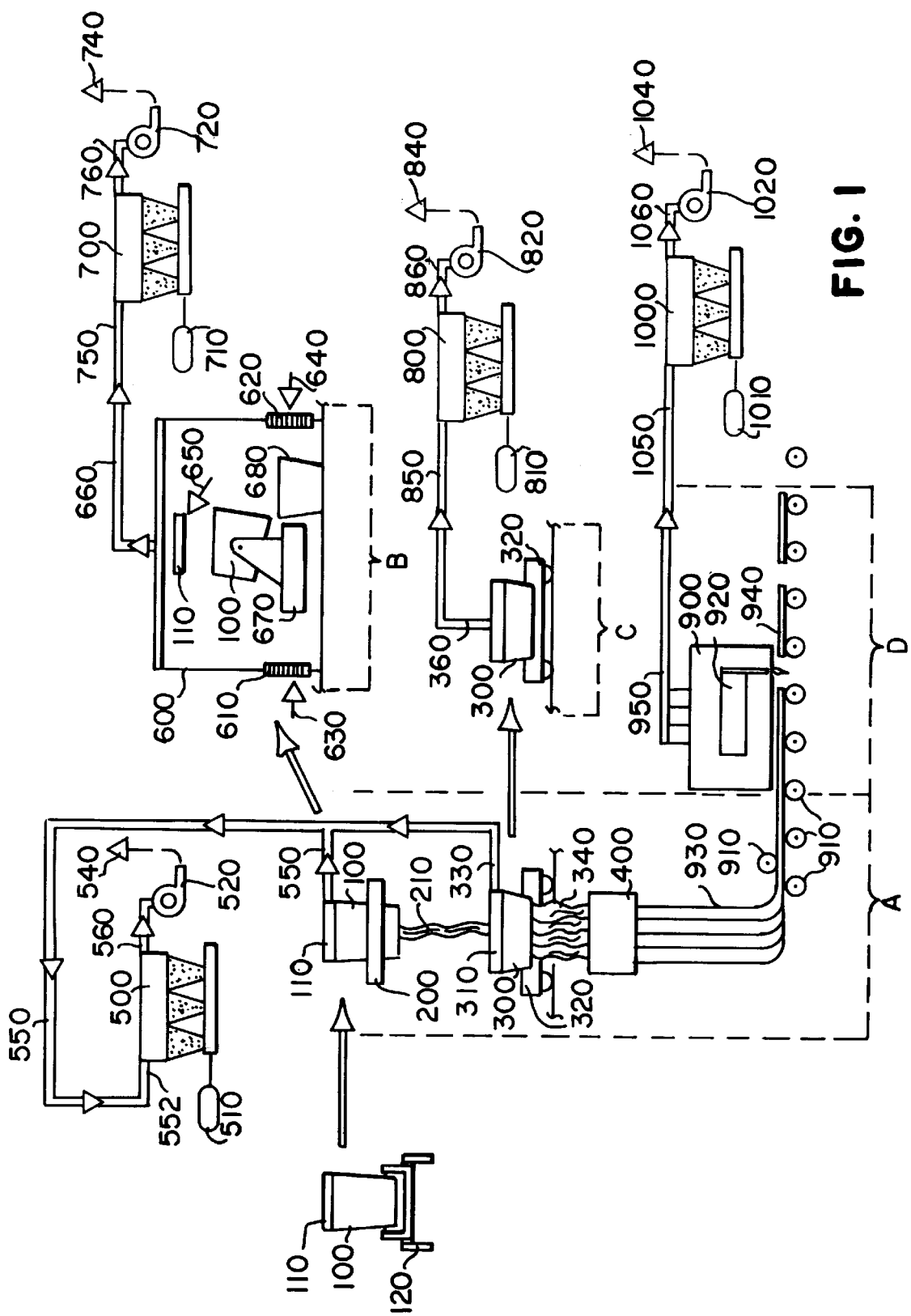
FIG. 1 is a schematic representation of a preferred embodiment fume collection system in accordance with the present invention.

FIG. 1 illustrates a process for the continuous casting of leaded steel. FIG. 1 further illustrates a preferred embodiment system in accordance with the present invention for collecting hazardous agents emitted from or associated with this process. The term "hazardous agents" as used herein includes agents, components, and particles of materials or components that are hazardous or potentially hazardous to human health, or which are considered to be pollutants or contaminants and which may be carried, entrained, or otherwise transported by a moving airflow or gas flow. Typically, such hazardous agents are in particulate form. An example of one such hazardous agent is lead.

The leaded steel manufacturing process to which the preferred embodiment system is particularly directed, comprises four major areas or phases as follows. The process includes a casting area designated in FIG. 1 as region A, a ladle slag dumping area designated as region B, a tundish cooling area designated as region C, and a torch cutting area designated as region D.

The primary components utilized in the process for producing leaded steel and in the preferred embodiment system for collecting hazardous agents associated with this process are as follows. A ladle 100 filled with molten metal and covered with a ladle cover 110 is disposed upon a ladle cart 120. The cart and its contents are transported to the casting area A. The filled ladle 100 and its cover 110 are positioned within a turret 200. The turret may be positioned above a tundish 300 to place the ladle in a casting position. When in such casting position, a first duct 550 is engaged and connected to the ladle cover 110. The ladle cover 110 has provisions for venting and directing fumes from the ladle 100 through the first duct 550. Preferably, the ladle cover 110 has a duct or chamber integral within the cover that extends between a series of inlet ports defined around the perimeter of the cover 110, and a single collection port also defined or provided on the cover 110. Upon engagement of a venting duct or hood, e.g., the duct 550, to the ladle collection port, hazardous agents emitted or disposed about the outer periphery of the ladle cover 110 are drawn into the cover duct or chamber, and through the collection port to the duct 550.

Upon initiation of a casting operation, molten metal contained within the ladle 100 is discharged from the ladle. A single stream 210 of molten metal is discharged from the ladle 100 and enters the tundish 300 through a tundish cover 310. The tundish 300, its contents, and the tundish cover 310, are preferably disposed upon a tundish cart 320. The tundish cover 310 also has provisions, namely one or more ducts 330, for engagement or connection to the first duct 550 for collecting fumes from the tundish 300. Preferably, the tundish cover 310 has an integral duct or hood that provides communication between the outer periphery of the tundish 300, preferably along its top region, and the interior of the tundish 300, and a single collection port provided on the cover 310 and/or associated hood. Upon engagement of a venting duct, e.g., the duct 330, to the tundish cover collection port, hazardous agents emitted or disposed about the outer periphery of the tundish cover 300 are drawn into the cover, and through the collection port to the duct 330. The one or more ducts 330 are preferably in communication with the duct 550, and so collected hazardous agents are drawn into the first duct 550.

A first filtering apparatus 500 is utilized to filter hazardous agents from the airflow in the duct 550, i.e. from the ladle cover 110 and the tundish cover 310. The first filtering apparatus 500 includes an inlet 552, an exhaust 560, a motor 510, an air handling assembly 520 in communication with the exhaust 560, and a discharge 540. These components are described in greater detail below.

The various filtering apparatuses described herein, including the first filtering apparatus 500, are preferably in the form of one or more baghouses. A preferred and commercially available baghouse device is the Wheelabrator Jet III Pulse Jet Dust Collector. The Jet III is an automatic, suction or pressure type dust collector that filters dust laden air through a felted filter media, such as Goretex. The dirty or contaminated air enters the dust collector through the inlet 552. A baffle plate disposed at or near the inlet 552 uniformly distributes the air throughout the enclosure of the apparatus 500. Heavy particles entrained within the incoming flow drop into a hopper disposed at the bottom of the apparatus 500. Dust laden air traveling past the baffle plate then passes through a series of filter bags. These bags retain the remaining dust particles, i.e. the hazardous agents, on their exterior surface while allowing the carrier gas, i.e. air, to pass through the apparatus 500 to the exhaust 560. As the apparatus 500 operates, the collected dust forms a dust cake that eventually diminishes the porosity of the filter. This reduction is measured by a U-tube manometer and is defined as the system pressure drop or differential pressure. As the pressure drop increases, system static losses will increase and ventilation volume will decrease. To maintain a moderate pressure drop, an automated cleaning cycle provides continuous cleaning of the filter bags. The cleaning cycle preferably utilizes an electronic program timer that actuates one or more electric solenoids governing air valves in the apparatus 500. The air valves deliver a momentary burst or pulse of high pressure air through a manifold pipe and create a reverse airflow through one or more rows of filter bags. This action cleans the filter bags. The cleaning action occurs on a row-by-row basis. Since only a fraction of the total filter air is interrupted for cleaning, continuous ventilation is possible. The dust cake, when pulsed from the filter bags, falls directly into the hopper and is removed by a dust conveying system. A motor, such as the motor 510, is used to operate a vibrator unit on the hopper to facilitate the collection of dust and particles in the hopper.

The air handling assembly 520 may be in the form of a conventional fan or blower unit in communication with the exhaust 560 to direct filtered airflow from the apparatus 500 to the discharge 540. The operation of the air handling assembly 520 creates a pressure differential thereby drawing airflow through the ducts 550 and 330 to the discharge 540. The pressure differential also draws air from, and thus through, the components in communication with the ducts 550 and 330, such as the ladle cover 110 and the tundish cover 310.

Continuing with the description of the leaded steel manufacturing process and the preferred embodiment fume collection system, upon initiation of a casting operation, multiple streams of molten metal exit the tundish 300. These are illustrated in FIG. 1 as item 340. The streams enter a bloom casting mold 400 which forms one or more continuous steel strands 930. The strands 930 exit the bloom casting mold 400 during which the metal solidifies and is formed into desired shape. One or more rollers 910 are utilized to support and assist moving the resulting strands 930. The steel strands 930 are directed from the casting area A to the torch cutting area D.

Upon completion of a casting operation and thus emptying of the ladle 100, the ladle 100 is covered with the ladle cover 110 and transported to the ladle slag dumping area. This area is illustrated in FIG. 1 as region B. A dumping bay or enclosure 600 is utilized to contain and collect fumes emitted during dumping of slag contained in the ladle 100. Once transported within the enclosure 600, the cover 110 is lifted from the ladle 100. The dumping bay 600 includes a first air intake 620 enabling airflow 640 into the enclosure 600, and a second air intake 610 allowing entry of another airflow 630 into the enclosure 600. It will be understood that airflows 630 and 640 are preferably flows of relatively fresh air from outside of the enclosure 600. It is preferred that a ladle tilter 670 be utilized to support and selectively orient the ladle 100 to an inverted position to dump slag from the ladle 100. A slag pot 680 is used to receive slag transferred from the ladle 100 during the dumping operation. Fumes collected within the enclosure 600 are directed upwards as shown by arrow 650 to an enclosure exhaust and into a second duct 660. The second duct 660 leads to an inlet 750 of a second filtering apparatus 700. Preferably, the second filtering apparatus 700 is a suction or pressure type dust collector similar to the first filtering apparatus 500. This second filtering apparatus 700 includes an inlet 750, an exhaust 760, a motor 710, an air handling assembly 720 in communication with the exhaust 760, and a discharge 740.

Upon completion of a casting operation by the tundish 300 and a pre-cooling period, the tundish and its cover 310 are moved to the tundish cooling area shown in FIG. 1 as region C. While in this region C, the tundish 300, while cooling, is placed in communication with a third duct 360 which leads to an inlet 850 of a third filtering apparatus 800. Preferably, the third filtering apparatus 800 is a suction or pressure type dust collector similar to the first filtering apparatus 500. This third filtering apparatus 800 includes a motor 810, an air handling assembly 820, an intake 850, an exhaust 860, and a discharge 840.

Disposed within the torch cutting area D is a torch cutting enclosure 900. One or more torch cutters 920 are disposed within the torch cutting enclosure 900 and serve to cut or otherwise sever the continuous strands of steel 930 into separate units shown as items 940. The torch cutting enclosure 900 collects fumes emitted within the enclosure and directs the fumes to a fourth duct 950. Hazardous agents collected within the fourth duct 950 are directed to a fourth filtering apparatus 1000. Preferably, the fourth filtering apparatus 1000 is a suction or pressure type dust collector similar to the first filtering apparatus 500. The fourth filtering apparatus comprises a motor 1010, an air handling assembly 1020, an inlet 1050, an exhaust 1060, and a discharge 1040.

A further and more detailed description of the preferred embodiment fume collection system is as follows. The fume collection system in region A is designed to capture lead fumes or other hazardous agents generated at the ladle cover 110 and at the tundish cover 310 when the tundish 300 is in the casting position or at its pre-cooling station, i.e., before it is moved to the tundish cooling area in region C. The ladle turret 200 receives the ladle 100. The ladle turret 200 rotates and positions the ladle 100 into the casting position. Once the ladle is in the casting position, a molten metal discharge nozzle is installed between the ladle 100 and the tundish 300. Casting may then begin in which molten metal is discharged from the ladle 100 to the tundish 300.

Prior to casting, the tundish 300 is positioned on the tundish car 320, and the tundish cover 310 is set on the tundish 300. One or more ducts 330 are engaged to the tundish cover 310 for drawing fumes and gases from the tundish 300. Preferably, the tundish cover 310 includes a hood assembly to which the ducts 330 engage or otherwise connect. Most preferably, this tundish hood assembly provides two ports along the top of the tundish 300 to which the ducts 330 connect. Normal operation of the system is such that lead fumes are captured at the ladle cover 110 during casting, and at the tundish cover 310 in either the casting position, or if after casting, during pre-cooling.

Without limiting the present invention, the following airflow capacities are provided to further describe the relative capacity proportions of the preferred embodiment fume collection system in region A. Approximately 31,250 acfm of airflow is drawn at the ladle cover 110. About 7,500 acfm of exhaust is drawn across each of the two exhaust ports on the tundish cover 310 while in the casting position. And about 7,500 acfm of exhaust is drawn across each of the two exhaust ports on the tundish cover 310 in the pre-cooling position. Motorized dampers are preferably provided on the ducts 550 and 330 to control the total and relative rates of airflow. Alternatively, in the event that multiple tundishes are not being run back to back, and so when casting with one tundish there will not be another tundish undergoing cooling, the system can be devoted to drawing fumes from the casting tundish. In this configuration, about 30,000 acfm is drawn at the tundish. The total design airflow rate for the first filtering apparatus 500 is about 65,000 acfm. After casting and pre-cooling of the tundish 300 have been completed, the system is preferably operated for one additional hour to remove any residual lead dust in the system.

A dilution air damper is provided in the duct 550 upstream of the first filtering apparatus 500 with a duct mounted thermocouple to protect the filtering apparatus 500 from over-heating. The damper opens to provide cooling air to reduce the temperature of the airflow when the incoming airstream temperature to the apparatus 500 exceeds 275° F., or some other predetermined temperature value. A temperature sensor, i.e., a thermocouple, and controller are preferably provided in the duct so that the temperature sensor is exposed to, or in communication with, airflow in the duct. The controller is operably engaged with the dilution air damper. Upon the temperature sensor sensing the airflow temperature being in excess of 275° F., the controller operates the damper to enable relatively cooler air, such as ambient air, to be drawn into the airflow in the duct and thereby reduce the airflow's temperature. This temperature sensor, controller, and damper system may be utilized in conjunction with all the filtering apparatuses 500, 700, 800, and 1000 described herein. The use of such components protects the respective filtering apparatus from being exposed to relatively high temperature and damaging air.

The ladle slag dumper fume collection system for region B is designed to capture lead fumes that escape into the ladle slag dumping enclosure 600. This occurs when leaded steel slag is dumped from the ladle 100 into a slag pot 680 using the ladle dumper equipment such as the tilter 670. As will be understood, after the ladle cover 110 is lifted or otherwise removed from the ladle 100, fumes and other gases are emitted from the ladle 100. Preferably, prior to removal of the ladle cover 110, an air handling system in communication with the interior of the enclosure 600 is operated. This draws relatively fresh air into the enclosure 600, depicted in FIG. 1 as airflows 630 and 640, through one or more intakes, shown as intakes 610 and 620. These entering airflows preferably travel upward through the enclosure 600 and assist in drawing the fumes and gases emitted from the uncovered ladle 100 upward, shown as flow 650. The cumulative flow is then directed out of the enclosure 600 through the second duct 660. Again, without limiting the present invention, a typical airflow capacity for this system serving region B is about 100,000 acfm. After the slag dumping operation has been completed, the system is preferably operated for an additional 15 minutes to ensure the removal of any residual lead dust from the system.

A dilution air damper is installed before the second filtering apparatus 700 with a duct mounted thermocouple to protect the apparatus 700 from over-heating. This damper opens to provide cooling air to reduce the temperature when the incoming airstream temperature to the apparatus 700 exceeds 275° F., or some other predetermined temperature value.

The tundish cooling and fume collection system located at the tundish cooling area, i.e. region C, is designed to capture lead fumes generated at the top of the tundish cover 310 during a final cooling cycle. The tundish 300 and tundish cover hood, which is in communication with and preferably mounted to the tundish cover 310, are transported to the tundish cooling stand. The assembly is preferably transported by a tundish cart 320. Two hinged exhaust ducts located at the tundish cooling station are rotated vertically into position to engage the two previously described corresponding exhaust ports on the tundish cover hood. Two manual balancing dampers serving this system are preset to draw about 7,500 acfm through a corresponding exhaust connection to the tundish cover hood. The total design airflow rate for this system is approximately 15,000 acfm. The third filtering apparatus 800 is operated continuously until acceptable tundish cool down is achieved, which typically occurs in approximately three to four hours. After cool down is achieved, the hinged exhaust ductwork is removed from the tundish cover hood. The exhaust system is then operated for one additional hour to remove any residual lead dust remaining in the system.

A dilution air damper is installed upstream of the filtering apparatus 800 with a duct mounted thermocouple to protect the apparatus 800 from over-heating. This damper will open to provide cooling air whenever the incoming airstream temperature to the apparatus 800 exceeds 275° F., or some other predetermined temperature value.

The torch cutting enclosure system is designed to provide fugitive lead fume capture at the torch cutting operation in region D. The torch cutting fume collection system consists of an enclosure 900 located above the strands 930 consisting of a structural steel frame and plate enclosure with one or more, such as five, exhaust ports each exhausting about 9,500 acfm from the interior of the enclosure 900. The collection of exhaust ports is preferably located symmetrically along the center and top of the enclosure 900. These ports provide a total exhaust rate of approximately 47,500 acfm from the enclosure 900. The torch cutting enclosure 900 also includes high temperature fabric roll-up doors along the lower portion perimeter of the enclosure to aid in lead fume capture. The collection of exhaust ports are in communication with the fourth duct 950 which leads to the fourth filtering apparatus 1000. This exhaust system may preferably be operated continuously, even if non-leaded steel is being cast, in order to remove excessive heat from the enclosure 900. The total exhaust rate from the torch cutting fume collection system is about 62,500 acfm. Upon shutdown of the torch cutting operation, the exhaust system is preferably operated for one additional hour to remove any residual lead dust in the system.

A dilution air damper is installed upstream of the fourth filtering apparatus 1000 with a duct mounted thermocouple to protect the apparatus 1000 from overheating. The damper opens to provide cooling air to reduce temperature when the incoming airstream temperature to the apparatus 1000 exceeds 275° F., or some other predetermined temperature.

Although the foregoing described fume collection system has been described as comprising a plurality of filtering apparatuses or baghouses, it is clearly within the scope of the present invention to utilize a single air handling and filtering apparatus. For example, a single air handling assembly and filtering apparatus could be utilized instead of the plurality of filtering apparatuses 500, 700, 800, and 1000.

Figure 2:
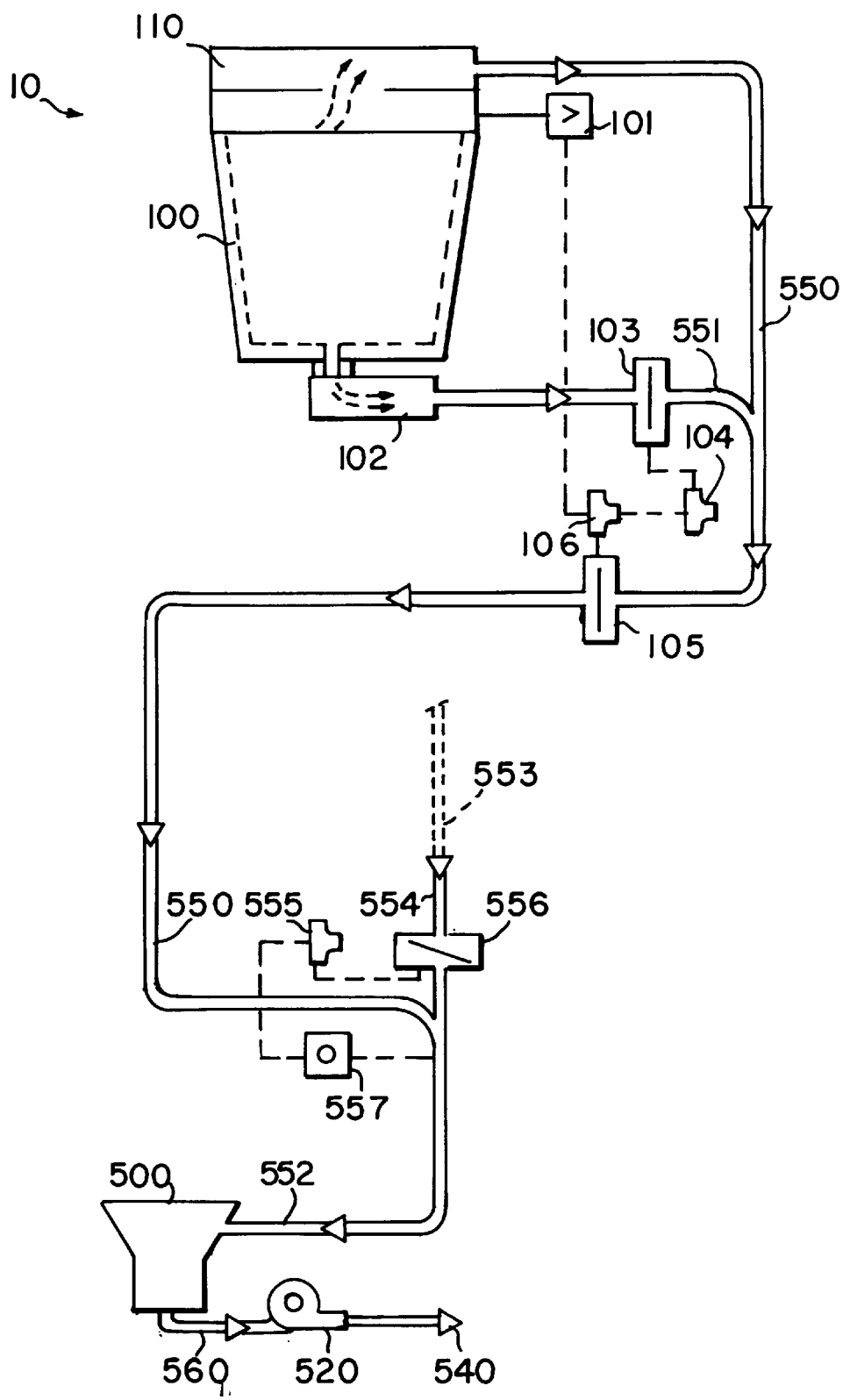
FIG. 2 is a schematic representation of a preferred embodiment segment or subsystem fume collection system in accordance with the present invention.

The present invention also provides a unique fume collection subsystem particularly adapted for collecting fumes in and around a ladle and cover, such as when the ladle and cover are in the casting area A. Referring to FIG. 2, a preferred embodiment fume collecting subsystem 10 is illustrated. The subsystem is used to collect fumes from the ladle cover 110 when disposed upon the ladle 100, and from a ladle discharge cassette hood 102 positioned under the ladle 100 and proximate to a discharge port of the ladle 100. The preferred embodiment subsystem 10 comprises a limit switch 101 engageable or otherwise in close proximity to the ladle cover 110, for providing a control signal indicating the position of the cover 110, i.e. to confirm that the cover 110 is properly positioned upon the ladle 100. The subsystem 10 further comprises a conduit 551 that provides fume or air flow from the cassette hood 102 to the previously described first duct 550. A damper 103, preferably a guillotine damper, is disposed serially in-line with the conduit 551. An actuator 104, preferably a pneumatic actuator, is operatively coupled to the damper 103 to regulate the flow of air or fumes through the conduit 551. The actuator 104 preferably is of the type to drive the damper 103 based upon one or more control signals. Collected fumes and air flow from the ladle cover 110 and the cassette hood 102 are combined in the first duct 550 and directed to the previously described first filtering apparatus 500. Preferably, before the combined flow reaches the inlet 552 of the first filtering apparatus 500, the combined flow passes through another damper 105, preferably in the form of a guillotine damper. The damper 105 is preferably driven by an actuator 106, which preferably is a pneumatic actuator. The actuator 106 is preferably driven or controlled by one or more control signals. The dampers 103 and 105 are preferably positionable, each between opened and closed positions. Although the dampers 103 and 105 are preferably positioned by the actuators 104 and 106, respectively, the dampers 103 and/or 105 may be manually positioned. Selective positioning of each of the dampers 103 and 105 enables control of the relative and total amount of flow drawn from the ladle cover and the cassette hood.

Referring further to FIG. 2, the preferred embodiment subsystem 10 further comprises an inlet 554 for withdrawing another source of air. Flow through the inlet 554 may be combined with yet another source of air 553. In the embodiment depicted in FIG. 2, the other source or flow 553 is a collected stream of exhaust flows from another part of the facility. The flow of the primary source of air 554, is preferably governed by an in-line damper 556, which preferably is in the form of a butterfly damper. The damper 556 is preferably operated by an actuator 555, which is preferably a pneumatic actuator. The actuator 555 is preferably driven by one or more control signals. After, or downstream of, the merging of the relatively cool flow, i.e. flows 553 and/or 554, with the combined flow of fumes and air collected from the ladle cover 110 and the cassette hood 102, the overall combined flow is then directed to the inlet 552 of the first filtering apparatus 500. Before the combined flow enters the inlet 552, an air flow sensor 557 measures or otherwise senses the combined flow and provides a control signal that is utilized, either directly or indirectly, to control the actuator 555. The actuator 555 and flow sensor 557 operate to regulate the flow through the damper 556 to thereby control the flow rate of air and collected fumes entering the first filtering apparatus 500.

Although not wishing to be bound to any particular dimensions or capacities, the following typical flow rates are described to further illustrate the relative capacities and flow rates within the preferred embodiment fume collecting subsystem 10. The ladle cover 110 has an air flow capacity of about 11,088 SCFM with a capture velocity of about 600 FPM. The first duct 550, proximate to the ladle cover 110, is approximately 30 inches in diameter and provides an airflow capacity of about 11,088 SCFM, 18,480 ACFM, and 3,765 FPM. The cassette hood 102 has a capacity of about 3,791 SCFM and a capture velocity of about 600 FPM. The first duct 550, downstream of the merger between flows from the ladle cover 110 and the cassette hood 102, is approximately 34 inches in diameter and handles about 24,780 ACFM, 14,868 SCFM, at 3,930 FPM. A duct about 46 inches in diameter may be utilized to handle the flow immediately upstream of the inlet 552 of the first filtering apparatus 500.

The present invention has been described with reference to the preferred embodiments. Obviously, modifications and alterations will occur to others upon a reading and understanding the preceding detailed description. It is intended that the invention be construed as including all such modifications and alterations in so far as they come within the scope of the appended claims or the equivalents thereof.

What is claimed is:

1. A fume collection system for a steelmaking process that emits hazardous airborne agents during an operation in which molten steel contained in a ladle is discharged into a tundish and subsequently discharged therefrom, the fume collection system comprising:

a ladle cover for collecting fumes emitted from said ladle;

a tundish cover for collecting fumes emitted from said tundish;

an enclosure adapted to receive said ladle and said ladle cover during a slag dumping operation, said enclosure including at least one air intake and an exhaust; and a filtering apparatus adapted to remove particulate hazardous agents from an airflow, said filtering apparatus in communication with said ladle cover, said tundish cover, and said exhaust of said enclosure.

2. The fume collection system of claim 1 further comprising:

a second enclosure adapted to collect hazardous agents emitted from a torch cutting operation performed upon solidified steel previously discharged from said tundish, said second enclosure including at least one air intake and an exhaust, and wherein said filtering apparatus is also in communication with said exhaust of said second enclosure.

3. The fume collection system of claim 1 further comprising:

a temperature sensor and controller in operative communication with a damper apparatus in communication with said filtering apparatus, said temperature sensor in communication with said airflow, wherein upon said temperature sensor sensing the temperature of said airflow to said filtering apparatus being in excess of a pre-set value, said damper apparatus is operated by said controller to add relatively cooler air with said airflow to reduce said temperature of said airflow.

4. The fume collection system of claim 1 further comprising:

a cassette hood disposed near a discharge port defined in said ladle, said cassette hood being in communication with said filtering apparatus.

5. The fume collection system of claim 4 further comprising:
- a first duct providing airflow communication between said filtering apparatus and said ladle cover and said tundish cover; and
- a conduit providing airflow communication between said cassette hood and said first duct.

6. The fume collection system of claim 5 further comprising:
- a positionable first damper disposed in-line in said conduit between said cassette hood and said first duct; and
- a positionable second damper disposed in-line in said first duct, downstream of said conduit;
- wherein selective positioning of each of said first and second dampers enables regulation of the relative and total amount of air flow drawn from said ladle cover and said cassette hood.

7. A fume collection system for a process for producing steel in which molten steel contained in a ladle is discharged into a tundish and subsequently discharged therefrom, said system comprising:
- a first cover adapted to cover said ladle, said first cover having provisions for collecting fumes from around the outer periphery of said ladle and directing said fumes to a port provided in said first cover;
- a second cover adapted to cover said tundish, said second cover having provisions for collecting fumes from within and around the outer periphery of said tundish and directing said fumes to a port provided in said second cover;
- a first filtering apparatus adapted to remove particulate hazardous agents from an airflow;
- a first duct providing communication between said first cover, said second cover, and said first filtering apparatus;
- an enclosure adapted to receive said ladle and said first cover, said enclosure including (i) provisions to lift said first cover from said ladle, (ii) orient said ladle to a position such that slag and other residual matter in said ladle fall out of said ladle, (iii) at least one intake, (iv) an exhaust, and (v) provisions for drawing relatively fresh air into said enclosure through said at least one intake;
- a second filtering apparatus adapted to remove particulate hazardous agents from an airflow; and
- a second duct providing communication between said exhaust of said enclosure and said second filtering apparatus.

8. The fume collection system of claim 7 wherein said first duct extends from said port provided in said first cover to said first filtering apparatus.

9. The fume collection system of claim 7 wherein said first duct extends from said port provided in said second cover to said first filtering apparatus.

10. The fume collection system of claim 9 wherein said first duct also extends from said port provided in said first cover to said first filtering apparatus.

11. The fume collection system of claim 7 further comprising:
- a damper apparatus in communication with said first duct and adapted to enable ambient air to be drawn into said first duct; and
- a temperature sensor and controller in operative communication with said damper apparatus, said temperature sensor in communication with airflow in said first duct, wherein upon said temperature sensor sensing the temperature of said airflow in said first duct being in excess of a pre-set value, said controller operates said damper apparatus to draw said ambient air into said first duct to reduce said temperature of said airflow.

12. The fume collection system of claim 7 further comprising:
- a damper apparatus in communication with said second duct and adapted to draw ambient air into said second duct; and
- a temperature sensor and controller in operative communication with said damper apparatus, said temperature sensor in communication with airflow in said second duct, wherein upon said temperature sensor sensing the temperature of said airflow in said second duct being in excess of a predetermined value, said controller operates said damper apparatus to draw said ambient air into said second duct to reduce said temperature of said airflow.

13. The fume collection system of claim 7 further comprising:
- a torch cutting enclosure having provisions for collecting air from an interior region of said torch cutting enclosure and directing said collected air to an exhaust;
- a third filtering apparatus adapted to remove particulate hazardous agents from an airflow; and
- a third duct providing communication between said exhaust of said torch cutting enclosure and said third filtering apparatus.

14. The fume collection system of claim 13 further comprising:
- a damper apparatus in communication with said third duct and adapted to draw ambient air into said third duct; and
- a temperature sensor and controller in operative communication with said damper apparatus, said temperature sensor in communication with airflow in said third duct, wherein upon said temperature sensor sensing the temperature of said airflow in said third duct being in excess of a predetermined value, said controller operates said damper apparatus to draw said ambient air into said third duct to reduce said temperature of said airflow.

15. The fume collection system of claim 7 wherein said tundish and said second cover are movable between a casting position at which said tundish may receive molten steel from said ladle and then discharge said molten steel, and a cooling position at which said tundish, after having discharged said molten steel, may cool, said system further comprising:
- a fourth filtering apparatus adapted to remove particulate hazardous agents from an airflow; and
- a fourth duct providing communication between said second cover disposed upon said tundish when said tundish is at said cooling position, and said fourth filtering apparatus.

16. The fume collection system of claim 15 further comprising:
- a damper apparatus in communication with said fourth duct and adapted to draw ambient air into said fourth duct; and
- a temperature sensor and controller in operative communication with said damper apparatus, said temperature sensor in communication with airflow in said fourth duct, wherein upon said temperature sensor sensing the temperature of said airflow in said fourth duct being in excess of a predetermined value, said controller operates said damper apparatus to draw said ambient air into said fourth duct to reduce said temperature of said airflow.

17. A fume collection system for a leaded steel manufacturing process, said process including (i) a casting area in which molten leaded steel is discharged from a ladle into a tundish, and in which said molten leaded steel is subsequently discharged from said tundish to form leaded steel strands, (ii) a slag dumping area in which slag is emptied from said ladle, (iii) a tundish cooling area in which said tundish is cooled, and (iv) a torch cutting area in which said leaded steel strands are severed, said fume collection system comprising:

a ladle cover adapted to fit upon and generally cover said ladle, said ladle cover having provisions for collecting fumes from around the outer periphery of said ladle and directing said collected fumes to a collection port defined in said ladle cover;

a tundish cover and hood assembly adapted to fit upon and generally cover said tundish, said tundish cover and hood assembly including provisions for collecting fumes from within and around the outer periphery of said tundish, and directing said collected fumes to at least one collection port defined in said tundish cover and hood assembly, said tundish movable between said casting area and said tundish cooling area;

a first filtering apparatus adapted to filter particles from an airflow;

a first duct providing communication between said ladle cover, said tundish cover and hood assembly, and said first filtering apparatus;

a dumping bay defining an interior region and having at least one intake, an exhaust, and provisions for drawing relatively fresh air into said interior region through said at least one intake;

a second filtering apparatus adapted to filter particles from an airflow;

a second duct providing communication between said exhaust of said dumping bay and said second filtering apparatus;

a third filtering apparatus adapted to filter particles from an airflow;

a third duct providing communication between said tundish cover and hood assembly and said third filtering apparatus when said tundish and said cover are disposed in said tundish cooling area;

a torch cutting enclosure defining an interior region and having provisions for collecting air from said interior region and directing said collected air to an exhaust;

a fourth filtering apparatus adapted to filter particles from an airflow; and a fourth duct providing communication between said exhaust of said torch cutting enclosure and said fourth filtering apparatus.

18. The fume collection system of claim 17 wherein said first duct extends from said collection port defined in said ladle cover to said first filtering apparatus.

19. The fume collection system of claim 17 wherein said first duct extends from said collection port defined in said tundish cover to said first filtering apparatus.

* * * * *